Patented Sept. 3, 1940

2,213,549

UNITED STATES PATENT OFFICE 2,213,549

SYNTHETIC RUBBER AND METHOD OF MAKING SAME

Jane C. Konow, Baltimore, Md.

No Drawing. Application October 28, 1939, Serial No. 301,832

5 Claims. (Cl. 106—39)

This invention relates to a composition of ingredients constituting a plastic and elastic mass resembling rubber, and which I have chosen to call synthetic rubber. The invention also relates to a method of making synthetic rubber; so I am applying the title synthetic rubber and method of making same.

One object of the invention is to provide a synthetic rubber composed of relatively inexpensive ingredients and effected by a relatively simple method, so that the cost of production will be considerably less than that of synthetic rubbers produced heretofore.

Another object is to provide synthetic rubbers of various consistencies, for various purposes, by varying the proportions of the ingredients.

Another object is to provide a synthetic plastic and elastic composition simulating crude rubber which can be vulcanized or heat-treated for producing synthetic rubber of different degrees of solidity or hardness; also to provide a synthetic plastic and elastic material that can be hardened by exposure to atmosphere and/or sun-heat for a period of time that may be varied according to the degree of hardness desired.

Other objects and important features are implied or pointed out in the following details of description which includes the formula and variations of the method of producing the synthetic rubber, as follows:

Formula (broadly)

Gluten, glycerine, spirits of turpentine, suitable acid.

Formula (specifically)

About 12 ounces of gluten of any suitable kind,
About 100 cubic centimeters of glycerine,
About 100 cubic centimeters of spirits of turpentine,
About 28 drops of sulphuric acid.
A modicum of water under certain conditions—may be omitted.

The above proportions may be varied according to the degree of hardness, elasticity, plasticity, etc., desirable for various uses.

Shorter method

After all or most of the starch and water are separated from the gluten, it should be weighed to the quantity or proportion desired according to the formula chosen or decided upon, substantially as shown above, and to this is added the chosen portions of glycerine and spirits of turpentine. These three ingredients should be well intermixed until all the glycerine and turpentine have been thoroughly absorbed by the gluten, resulting in a doughy or plastic mass, and this should be worked or kneaded until it is free from lumps and is of uniform consistency; whereupon, the acid should be added and thoroughly distributed through the mass by kneading and/or pulling similar to pulling taffy or other candy. The method is facilitated by having all the ingredients warm when intermixing them; and the gluten should be quite warm when the glycerine and turpentine are added.

Longer, less laborious method

All the ingredients, except the acid, are put in a receptacle with a little water, keeping them warm while stirring them intermittently or occasionally until the gluten has thoroughly absorbed the other ingredients and the mass is uniform; thereafter add the acid, stir the mass until the acid is thoroughly distributed, then leave the mass exposed to air and/or sunshine until enough of the water and turpentine have evaporated to effect a mass of the desired degree of plasticity for the specific purpose intended.

Each of the above variations of the method produces a composition having properties similar to those of unvulcanized rubber, and one of these properties is the capability of being vulcanized to various degrees of solidity or hardness.

It is not my intention to limit my patent protection to the precise ingredients or proportions set forth in the foregoing, nor to the precise methods of which these two variations are given as examples, for the invention is susceptible of other variations within the scope of the inventive ideas as implied and claimed.

What I claim as my invention is,

1. An elastic composition which includes gluten, glycerine, spirits of turpentine, and suitable acid, substantially as described.

2. An elastic composition which includes ingredients in substantially or approximately the following proportions, viz., 12 ounces of gluten, 100 cubic centimeters of glycerine, 100 cubic centimeters of spirits of turpentine, and twenty-eight drops of a suitable acid, substantially as described.

3. An elastic composition which consists substantially entirely of gluten, spirits of turpentine, sulphuric acid and glycerine.

4. The method of making an elastic composition of the ingredients gluten, glycerine, spirits of turpentine and acid, consisting in thoroughly intermixing the gluten and glycerine and spirits of turpentine, and thereafter adding and thoroughly intermixing the acid.

5. The method defined by claim 4, and the further or additional steps of adding and incorporating a volatile liquid, and exposing the mass to air for a time sufficient to evaporate a desired quantity of the volatile liquid.

JANE C. KONOW.